United States Patent
Maliszewski et al.

(10) Patent No.: US 7,448,169 B2
(45) Date of Patent: Nov. 11, 2008

(54) METHOD FOR CONSTRUCTING AND ERECTING A TOWER WITH BALLISTIC RESISTANT ENCLOSURE

(75) Inventors: Leonard P. Maliszewski, Shreveport, LA (US); Patrick M. McGowan, Dubach, LA (US)

(73) Assignee: Beaird Company, Ltd., Shreveport, LA (US)

( * ) Notice: Subject to any disclaimer, the term of this patent is extended or adjusted under 35 U.S.C. 154(b) by 702 days.

(21) Appl. No.: 11/199,053

(22) Filed: Aug. 8, 2005

(65) Prior Publication Data

US 2007/0289250 A1    Dec. 20, 2007

Related U.S. Application Data

(60) Provisional application No. 60/600,487, filed on Aug. 11, 2004.

(51) Int. Cl.
*E04H 1/00* (2006.01)

(52) U.S. Cl. ............... 52/79.1; 52/40; 52/170; 52/301; 52/651.01

(58) Field of Classification Search .......... 52/40, 52/79.1, 160, 169.13, 170, 300, 301, 651.01, 52/651.03, 651.05, 651.07, 651.08, 651.1, 52/849, 745.17, 745.19, 745.09, 745.1, 343, 52/874, 875

See application file for complete search history.

(56) References Cited

U.S. PATENT DOCUMENTS

| | | | | |
|---|---|---|---|---|
| 457,819 | A * | 8/1891 | La Verne | 52/40 |
| 3,733,834 | A * | 5/1973 | Ludwig | 405/211 |
| 3,768,016 | A * | 10/1973 | Townsend et al. | 455/25 |
| 4,068,419 | A * | 1/1978 | Decoppet | 52/40 |
| 6,470,645 | B1 * | 10/2002 | Maliszewski et al. | 52/745.18 |
| 6,532,700 | B1 * | 3/2003 | Maliszewski et al. | 52/40 |
| 6,713,891 | B2 * | 3/2004 | Kirkegaard et al. | 290/44 |

* cited by examiner

*Primary Examiner*—David R Dunn
*Assistant Examiner*—Jessica Laux
(74) *Attorney, Agent, or Firm*—Buskop Law Group, P.C.; Wendy Buskop

(57) ABSTRACT

A method for constructing a ballistic resistant tower entails forming a tower ring for a ballistic resistant tower and welding a ballistic resistant stub to a structural ring on a ballistic resistant enclosure. The enclosure includes a hatch to allow entry into the enclosure. An embedment ring with perforations is constructed so that the ring can support a dynamic load and an impulse load of at least 24 psi for 5 milliseconds. The embedment ring is secured to a foundation and one or more tower rings are secured to the embedment ring using a slip ring. The slip ring ensures that the alignment of the tower ring with the embedment ring is correct. The method ends by slipping the ballistic resistant stub into the interior side and the upper end of the tower ring and welding the ballistic resistant stub to the interior side of the tower ring.

16 Claims, 9 Drawing Sheets

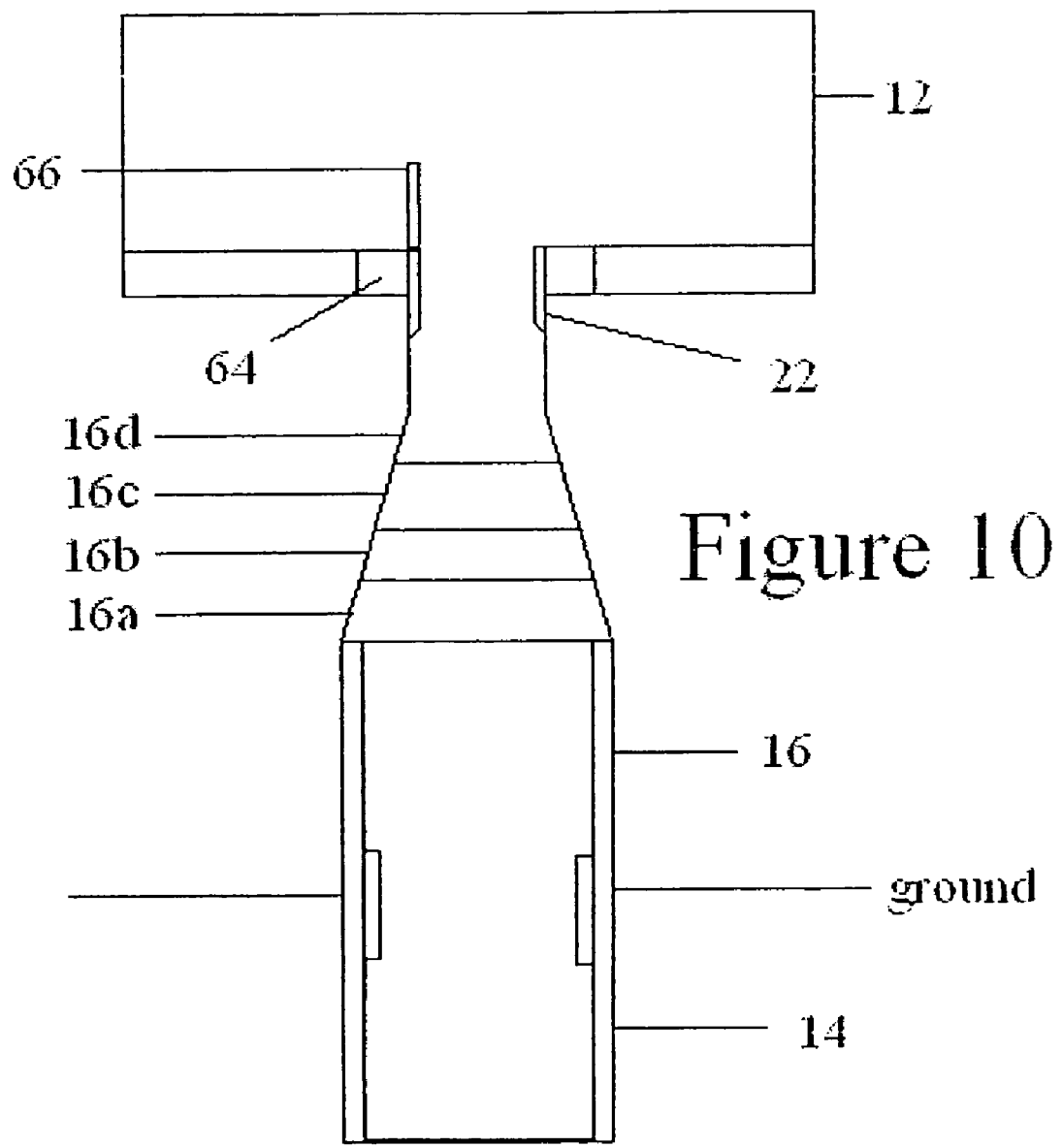

US 7,448,169 B2

METHOD FOR CONSTRUCTING AND ERECTING A TOWER WITH BALLISTIC RESISTANT ENCLOSURE

CROSS REFERENCE TO RELATED APPLICATIONS

The present application claims priority to co-pending U.S. Provisional Patent Application Ser. No. 60/600,487, filed on Aug. 11, 2004.

FIELD

The present embodiments relate to a method for forming a pressure resistant tower(s) that are capable of withstanding external terrorist bomb attacks particularly for a nuclear facility, a prison facility, a subsea facility or other structure.

BACKGROUND

A great deal of interest is presently being shown in the development of structures for nuclear facilities, subsea platforms and others which are impulse load resistant, and adapted to sustain winds and storms with wind speeds of up to 300 mph.

Additionally, for the nuclear industry, events of the last few years have greatly heightened the awareness of nuclear plant owners and designs to build towers to reduce the threat of terrorist attacks using explosives and other gun and missile fire. The United States government has funded extensive research into blast analysis and protective design methods and produces a number of guidelines for its own facilities. The nuclear plant industry has not had towers designed which can sustain the maximum reflected pressure and total reflected impulse of a load of a missile.

The present methods were designed to provide a method for constructing and erecting a tower for nuclear facilities or other sensitive facilities which has a structural design to sustain external terrorist bomb attacks and provide a safe haven for the guards or other personnel assigned to provide watch services from the tower.

BRIEF DESCRIPTION OF THE DRAWINGS

The detailed description will be better understood in conjunction with the accompanying drawings, wherein like reference characters represent like elements, as follows:

FIG. 10 depicts a cross sectional view of a tower embodiment with three tower rings, wherein two tower rings are conical in shape.

Figure 1:
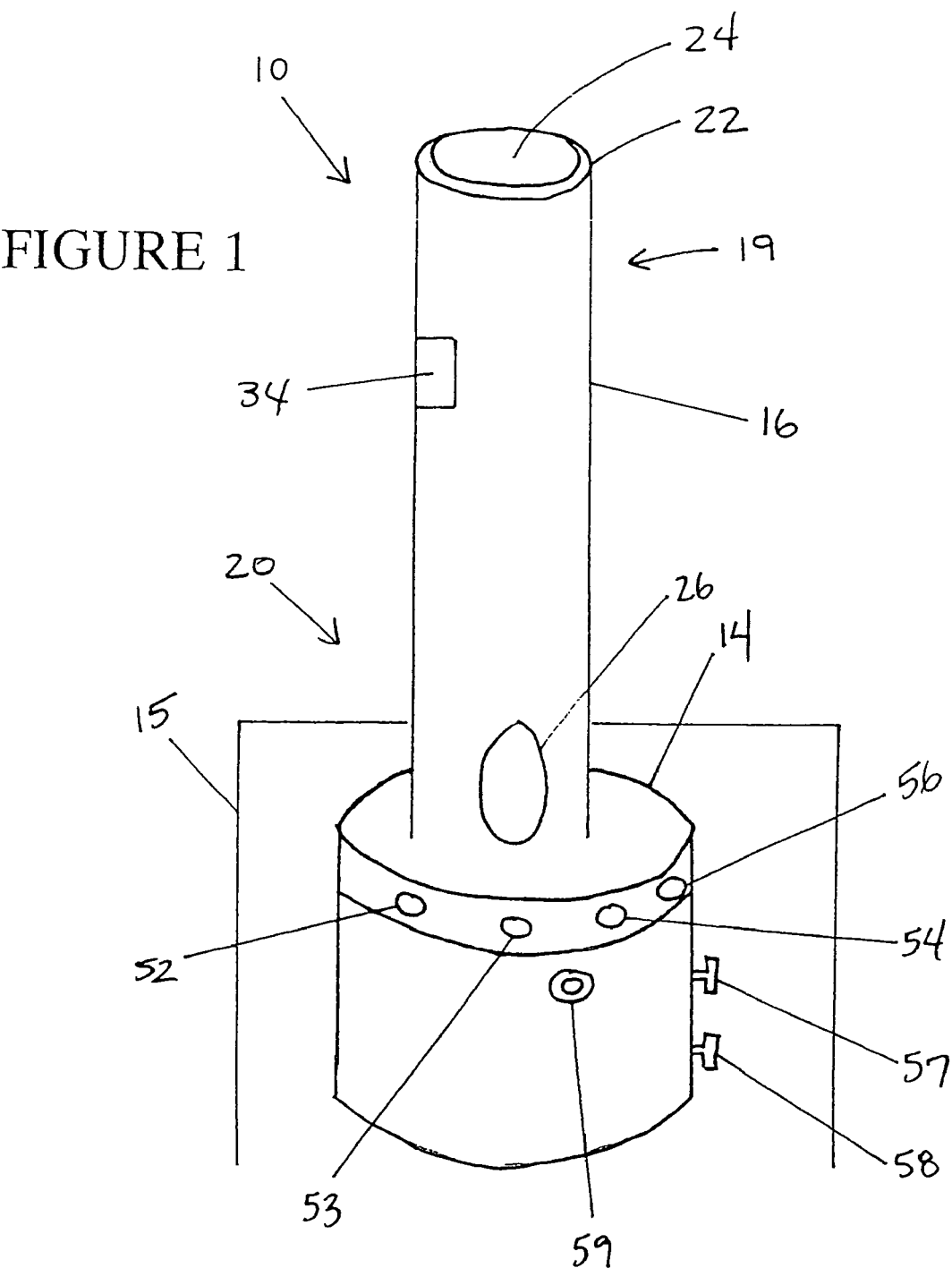
FIG. 1 is a side view of an embodiment of an erected tower without the elliptical ballistic resistant housing component disposed thereon.

The present method is detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that the embodiments can be practiced or carried out in various ways.

The embodied methods relate to methods of construction for a tower with a ballistic resistant enclosure connected integrally with the tower that can resist terrorist bomb attacks, high winds, and storms with winds up to and over 300 mph. The tower includes an elliptical and wind resistant enclosure that can save the lives of the guards or personnel assigned to watch from the top of the tower. The tower can continue to provide communication and power support to the top of the tower in extreme conditions or attack conditions.

The novel methods are for forming a tower ring for a ballistic resistant tower with an interior, an upper end, and a lower end. The tower ring includes one or more marine doors, a platform, a staircase or ladders, and a platform welded to the interior of the tower ring. The tower includes numerous conduits fixed on the interior side of the tower that transfer communication and power from the lower end to the upper end of the tower ring.

The method entails welding a ballistic resistant stub to a structural ring on a ballistic resistant enclosure. The ballistic resistant enclosure has a hatch for permitting entry of personnel into the ballistic resistant enclosure. An embedment ring with perforations is constructed, wherein the embedment ring supports a dynamic load and an impulse load of at least 24 psi for 5 milliseconds. The embedment ring is secured to a foundation, and one or more tower rings are secured to the embedment ring using a slip ring. The slip ring assures alignment of the tower ring with the embedment ring. Typically, the foundation comprises a rebar support over high stress cement. Alternatively, the method can include the step of inserting portions of the rebar into perforations in the embedment ring prior to pouring concrete over the rebar to assure resistance to the impulse loading. The method can include the step of bolting the embedment to a preexisting foundation.

The method continues by slipping the ballistic resistant stub into the interior side of an upper end of the tower ring; and finally, the ballistic resistant stub is welded to the interior side of the tower ring. The method can include the step of forming air vents in the tower ring to insure air flow through the tower ring The method can further include using shear studs welded to the embedment ring prior to pouring concrete to form the foundation.

The formed novel tower with housing is constructed from metal whose dimensions are optimized using an optimization program. The dimensions are optimized to determine the exact thickness for each individual plate used in the tower construction in order to achieve minimum steel thickness while maintaining structural integrity and overall strength in the tower. By minimizing the steel thickness, material cost is reduced, as well as the cost of transporting the tower and the cost in man hours to cut the steel or other metal used in the tower.

Each tower is designed to endure various earthquake and wind parameters dictated by specialty certification-governing bodies and complies with OSHA standards for human ingress and egress.

With reference to the figures, FIG. 1 shows one embodiment of the tower as a tower with a height of about ten feet. The embodied towers can range in height from about 10 feet to over 250 feet. For the larger towers, the tower can be constructed of sections, each about ten feet in height. The example heights for the towers can be ten feet tall, twenty feet tall, forty feet tall, and up to eighty feet tall.

FIG. 1 shows an embodiment of a ten foot tower without the ballistic resistant housing. The tower 10 is made up of an embedment ring 14 that can be attached to a foundation 15 of the tower. The foundation can be a preexisting foundation on which the tower is placed and secured. The tower can be secured to the foundation with additional concrete, or the foundation can be created or formed around the embedment ring.

The embedment ring has perforations 52, 53, and 54 that can receive rebar from a surrounding foundation. The concrete can then be poured around the embedment ring with secured rebar. In an alternative embodiment, shear studs 56, 57, 58, and 59 can be attached to the embedment ring to assist in holding the embedment ring into the foundation to be poured around the ring. FIG. 1 depicts four shear studs, but numerous shear rings can be used as the size of the tower requires. Up to three rows of perforations can be used on an embedment ring, with thirty six holes per row. For the shear studs, between eighty and two hundred and twenty shear studs can be used on one embedment ring. The shear studs can be T-shaped and formed from steel. The size of the shear stud can be about 7;8-inch in diameter and four inches in length.

Figure 2:
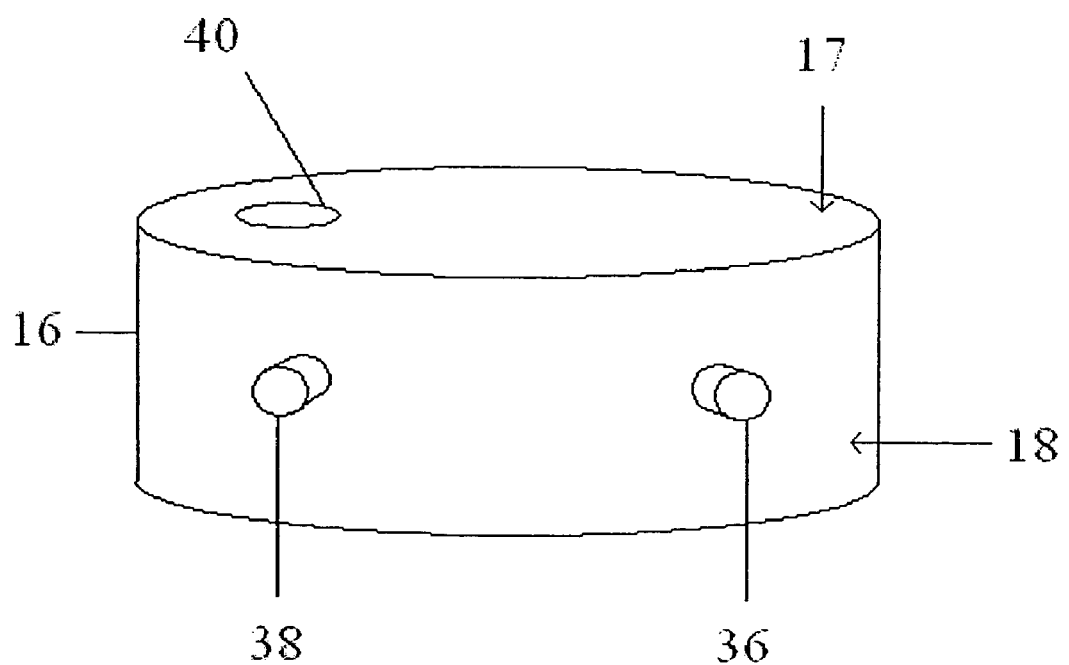
FIG. 2 depicts a detailed perspective view of an embodiment of a tower ring.

The tower can be formed from one or more tower rings 16. The tower rings can be all cylindrical and welded flush to each other. The tower rings can have identical diameters. A cylindrical tower ring 16 is shown in more detail in FIG. 2. The ring has a plurality of vents 36, 38 and 40 disposed in the upper end of the ring. FIG. 2 depicts the ring's interior side 17 and an exterior side 18.

Returning to FIG. 1, the tower ring can have an upper end 19 and a lower end 20. The lower end 20 engages the embedment ring 14. The tower ring can be made from metal plate material, such as steel. The plate material implements finite element analysis to simulate a time-history impulse loading that can be anticipated for the field use of the tower. The unique optimization program maximizes the thickness of the steel needed in view of the anticipated ballistic blast or anticipated storm pressures and minimizes the weight. The optimization produces secondary benefits, such as minimizing labor costs due to a need for less welding and minimizing construction costs, since only the minimum amount of steel can be used in the construction process. The finite element analysis, in view of the load desired, can be an environmentally enhanced technique for building these kinds of towers.

The embedment ring is preferably a cylinder, such as a metal cylinder composed of steel. The embedment ring can be fifty inches high.

A ballistic resistant stub 22 with a stub opening 24 is welded to the interior side 17 of the upper end 19 of the tower ring 16. The stub opening 24 has to be large enough to accommodate an adult human through the opening, preferably carrying equipment, such as guns or other tools. The opening can be any shape, such as square or rectangular. As an example, an opening can be at least thirty-six inches in diameter.

A marine door 26 can be welded into the lower end of the tower ring. The marine door can be elliptical in shape and made of steel. The marine door locks with one latch and can have a gasket to insure that the interior of the tower is water resistant and shock resistant. The marine door typically does not require a key to open from the inside of the tower in order to provide a fast and secure exit from the tower. Once latched from the inside, a key is necessary to open the door from the outside, thereby preventing any unauthorized entry. An example of the marine door can be provided by Beaird Company LTD of Shreveport, La.

The platform 28 can be C-shaped and attached to about one half of the perimeter of the interior of the tower. The platform 28 can be a solid plate with a safety bump pattern. The platform 28 can have a handrail to prevent persons from falling off the platform 28. The plate material is about one-quarter inch in thickness and is optimized for weight and structural support to the tower ring in order to assist in sustaining severe impulse load and extreme pressures. The platform can be self-supporting through welding to the interior side of the tower ring. In alternative platform designs, the platform can be a metal grate, an expanded metal grate, or a perforated design that allows air flow around the platform to reduce humidity build up that can cause rusting. Alternatively, the platform can be a D-shaped with the curve of the "D" welded to the interior side of the ring.

An auxiliary marine door 34 can be added to tower ring at the level of the platform. The auxiliary marine door 34, like the marine door 26, can use encapsulated gaskets to insure water and shock resistance. Platform extensions can be added to make access to this auxiliary door easier.

Figure 3:
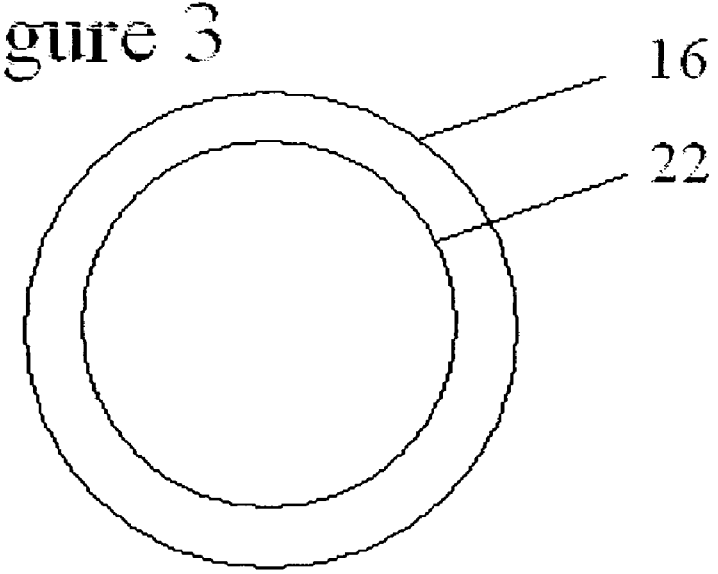
FIG. 3 depicts a top view of an embodiment of a cylindrical ballistic resistant stub engaging tower ring.

FIG. 3 shows a top view of the stub 22 that is welded to the interior side of the tower ring 16 making a tight engagement.

Figure 4:
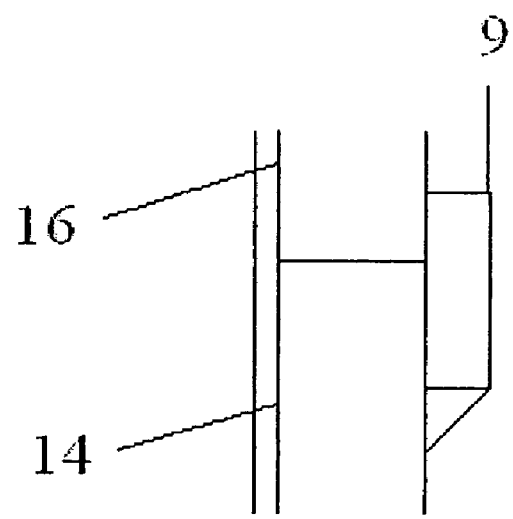
FIG. 4 depicts an embodiment of the connection use for the embedment ring.

FIG. 4 shows a cross sectional detail of the embedment ring 14. The embedment ring 14 has an embedment ring guide 9 for securing the embedment ring to the tower ring 16.

Figure 5:
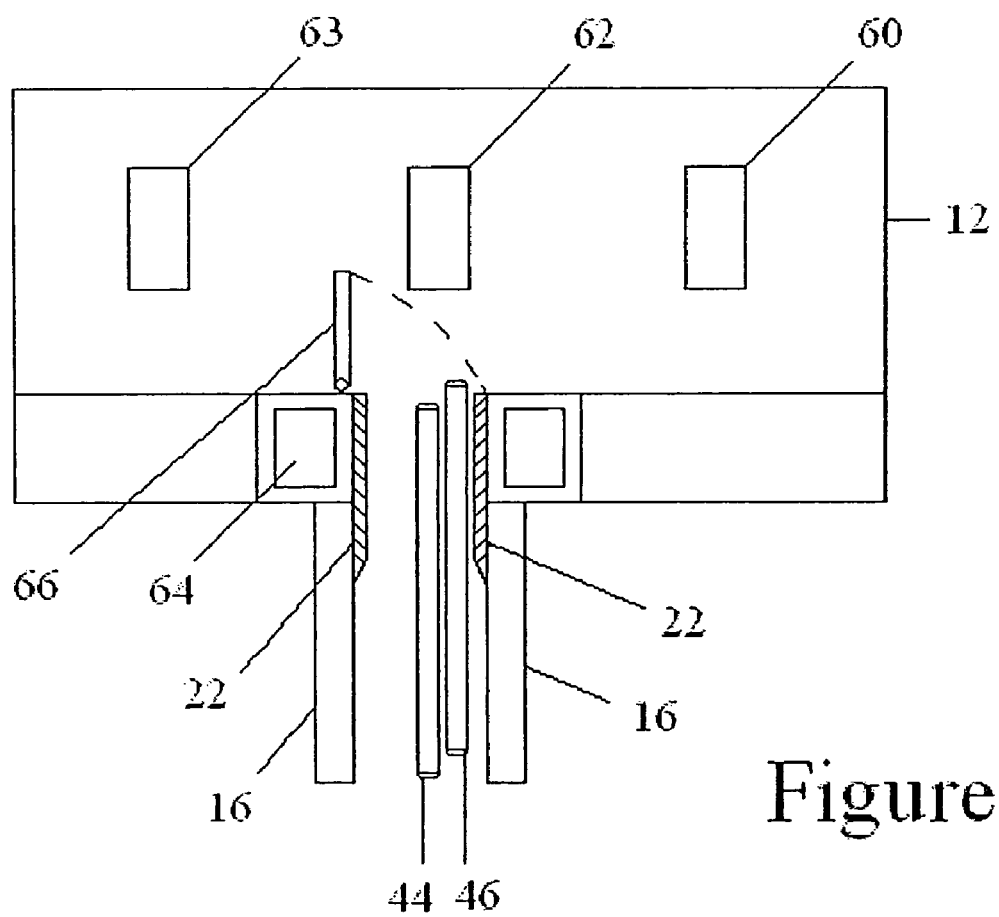
FIG. 5 depicts a cross sectional view of a ballistic resistant enclosure disposed over a tower ring with gun ports.

FIG. 5 shows the ballistic resistant enclosure (BRE) 12 mounted to the tower ring 16. The BRE is a rectangular housing with a plurality of gun ports, 60, 62, and 63 or spotter windows. The housing can be secured to a BRE stub support ring that is welded to the housing. The BRE stub support ring 64 is then welded to the interior side of the tower ring. A hatch 66 can be inserted in the floor of the preformed housing and acts as a man way access. As an example, the hatch can be at least thirty-six inches wide, but can be wider depending on whether the man needs to carry large equipment or big guns. Additionally, a power conduit 44 and/or a communication conduit 46 can be welded to the interior side of the tower ring to provide a secure and protected conduit of these lines to the top of the tower in the event of a ballistic blast. The ballistic resistant enclosure can have a rectangular or box shape, as depicted in FIG. 5. Alternatively, the ballistic resistant enclosure can be cylindrical or elliptical.

Figure 6:
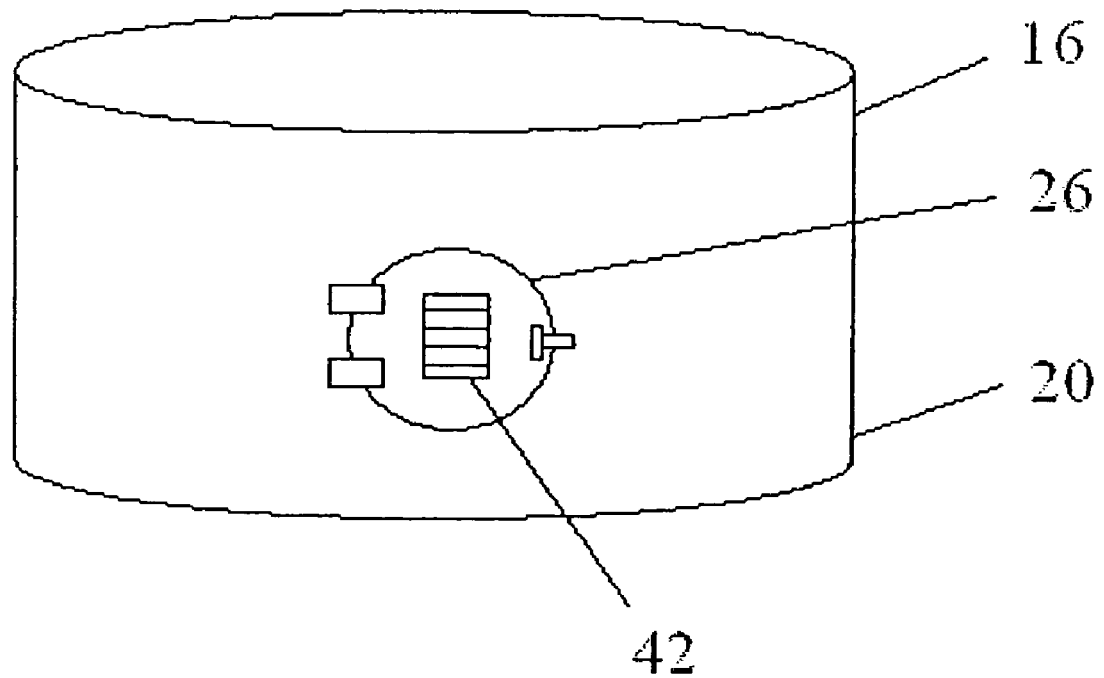
FIG. 6 depicts an external perspective view of the marine door disposed in the tower ring.

FIG. 6 shows a front view of the tower ring 16 with the marine door 26 disposed in the tower ring. The door 26 has a gasket to make the seal watertight and to facilitate shock resistance in control of shock waves. The door 26 can have a vent to facilitate airflow. The auxiliary door 34 can have one or more vents as well. A person enters through the door way to the interior of the tower ring 16 and then ascends a staircase 30 to a platform 28.

Figure 7:
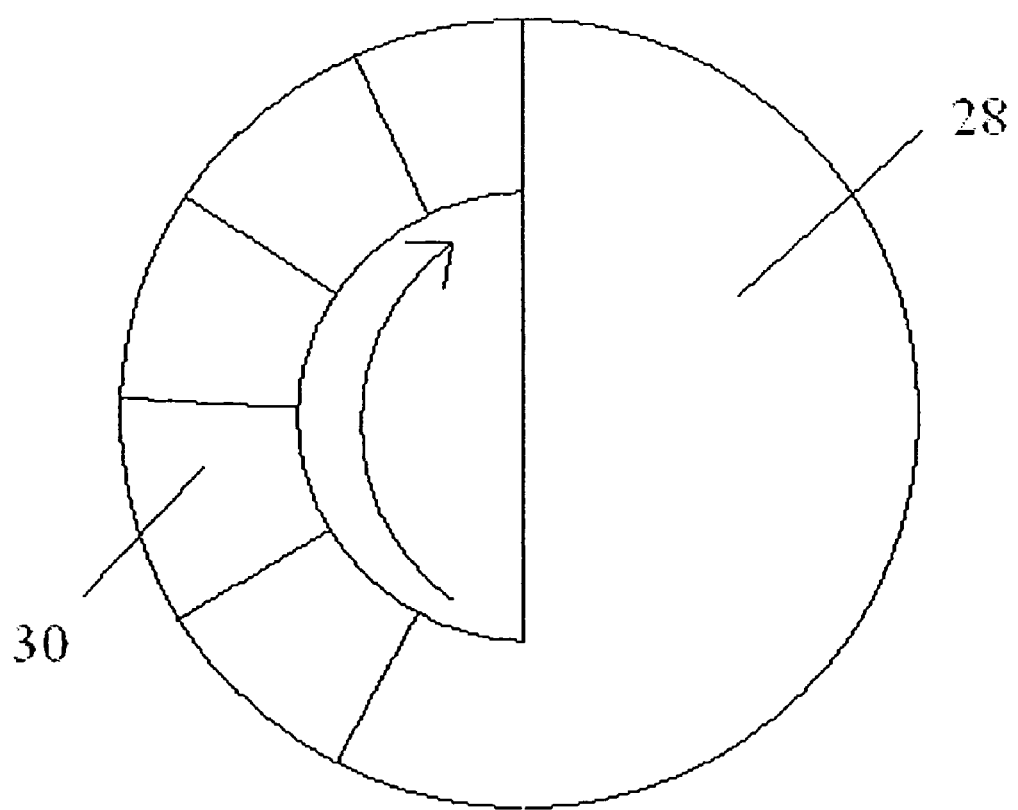
FIG. 7 depicts a top view of the interior of the tower with a platform and spiral staircase.

FIG. 7 is a top view of the spiral staircase that has a handrail that connects to the platform 28. Alternatively, the auxiliary door can lead to the platform 28. The spiral staircase can be connected to the interior side of the tower ring or can be free standing between the embedment ring and the platform.

Figure 8:
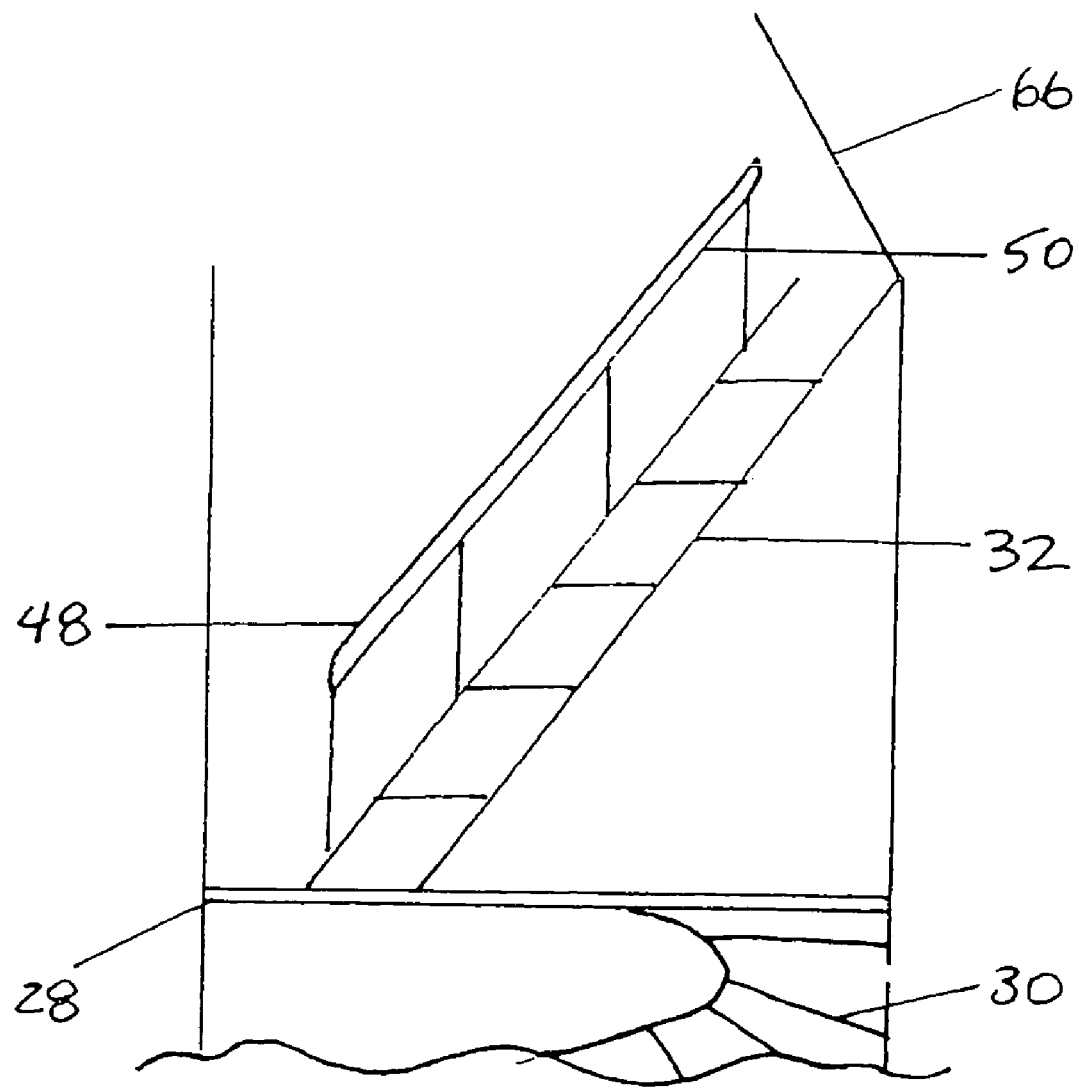
FIG. 8 depicts a cross sectional interior view of the upper end of the tower ring between the platform and the ballistic resistant enclosure.

FIG. 8 depicts that the person then ascends a ship ladder 32 that connects the platform 28 to the opening 24 and through the hatch 66. The ship ladder can have a first handrail 48 and a second handrail 50 to help support the ascension.

Figure 9:
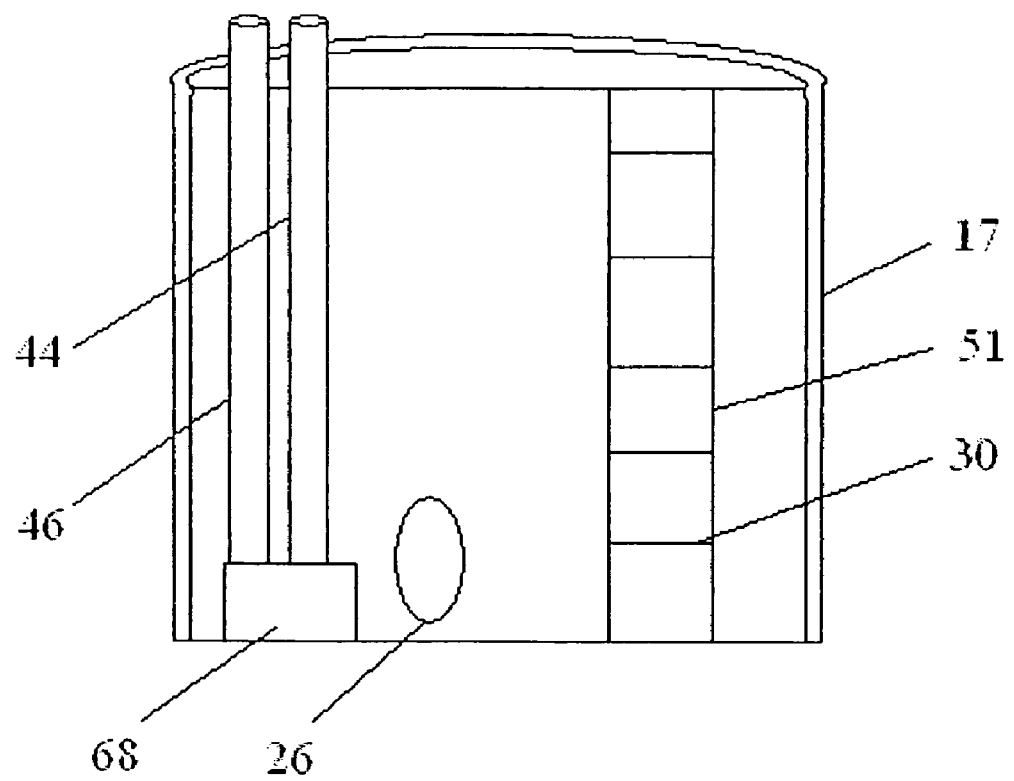
FIG. 9 depicts an interior cross sectional view of the spiral staircase with marine door.

FIG. 9 depicts an interior view of the tower ring with the spiral staircase 30 and a handrail 51 that a person can use from the door 26 to the platform. Additionally, a control box 68 on the interior of the tower can connect to the conduits 44 and 46 for added safety in the event of a ballistic blast.

In an alternative embodiment, two or more tower rings can be joined together. A first tower ring can be cylindrical and is connected to the embedment ring. A second conical tower ring 16a can be welded flush to the upper end of the first tower ring. Another cylindrical tower ring can then be welded to the conical tower ring for engaging the ballistic resistant stub 22.

FIG. 10 depicts an embodiment of a tower that is modular for ease of construction in the field and ease of transportation, thereby minimizing cost. The first tower ring 16 is connected to the embedment ring 14; a conical tower ring 16a is flush welded to the tower ring 16; another conical tower ring 16b is connected by flush welding to the conical tower ring 16a; and, another conical tower ring 16c is welded to conical tower ring 16b. A cylindrical tower ring 16d is then welded to conical tower ring 16c to engage the BRE 12. Multiple tower rings can be used depending on the height of the desired tower.

The tower can be made of metal plates that are optimized to minimize weight while maximizing resistance to an impact load at about 5 psi for about 200 milliseconds. The steel used in the embodied tower can be optimized to sustain an impact load of about twenty-four psi for a pulse duration of about five milliseconds using finite.

In an embodiment, a ship ladder 32 with steps and handrails are located in the interior of the tower. The ladder 32 can be made from of steel, but other materials can be used to reduce the cost of shipping, such as a polymer, PVC, fiberglass, a plastic coated metal, a laminate structure, or combinations of these materials. Steel can be used so that everything inside the tower ring 16 is fireproof. The fireproofing is a significant benefit in case incendiary devices are used against the tower. The ship ladder 32 has a first handrail 48 and a second handrail 50 on either side of the ships ladder. This embodiment of the tower is designed to OSHA regulations specification.

In an alternative embodiment, the ships ladder 32 is installed with parallel legs and rungs disposed between the legs are affixed there. The ladder 32 with rungs is attached to the interior side of the tower ring in a spaced relationship from the sides of the tower using supporting brackets. By attaching the ladder 32 on the interior of the tower, guards with guns or other equipment can use the interior of the tower without the need for any additional safety equipment, such as a safety harness going up the ladder. In this embodiment, the ladder is then of a vertical construction, which enables the back of a guard or other person to stay in close contact with the interior wall of the tower so that climbing occurs more safely than in the other position.

The tower can utilize cylindrical sections. For example, a twenty foot tower can use two tower rings, and each can have the exact same outer diameter. The tower can be made from two or more conical shaped tower rings with a slope of up to fifteen degrees.

The tower can include a coat of 20-year life paint to prevent corrosion or can be made of a ballistic resistant steel.

Control boxes can be welded to the tower ring and connected to the interior side of the tower ring to support power and signal cables from the a terrorist attack. The control boxes also ensure continued signal and power supply even in the event of an attack or extreme weather condition.

In an alternative embodiment, the embodied methods are for constructing towers to ballistic resistant enclosures inside a nuclear facility.

While these embodiments have been described with emphasis on the preferred embodiments, it should be understood that within the scope of the appended claims, the embodiments might be practiced other than as specifically described herein.

What is claimed is:

1. A method for constructing a ballistic resistant tower comprises the steps of:
   a. forming a tower ring for a ballistic resistant tower comprising an interior side, an upper end, and a lower end, wherein the tower ring further comprises
      i. a marine door welded at the lower end;
      ii. a platform connected to a portion of the interior side;
      iii. a spiral staircase for connecting the marine door to the platform;
      iv. a ship ladder for connecting the platform to an opening; and
      v. a plurality of conduits fixed on the interior side connecting the lower end and the upper end, and wherein the conduits for communication and power transfer extend from the lower end to the upper end.
   b. welding a ballistic resistant stub to a structural ring on a ballistic resistant enclosure, wherein the ballistic resistant enclosure comprises a hatch for permitting entry of personnel into the ballistic resistant enclosure;
   c. constructing an embedment ring with a plurality of perforations, wherein the embedment ring is adapted to support a dynamic load and an impulse load of at least 24 psi for 5 milliseconds;
   d. securing the embedment ring to a foundation;
   e. securing at least one tower ring on the embedment ring using a slip ring, wherein the slip ring assures alignment of the tower ring with the embedment ring;
   f. slipping the ballistic resistant stub into the interior side and the upper end of the tower ring; and
   g. welding the ballistic resistant stub to the interior side of the tower ring.

2. The method of claim 1, wherein the foundation comprises a rebar support over which high stress cement is poured.

3. The method of claim 2, further comprising the step of inserting portions of the rebar into perforations in the embedment ring prior to pouring concrete over the rebar to assure resistance to the impulse loading.

4. The method of claim 1, further comprising using a plurality of shear studs welded to the embedment ring prior to pouring concrete to form the foundation.

5. The method of claim 1, further comprising the step of bolting the embedment ring to a preexisting foundation.

6. The method of claim 1, further comprising the step of forming air vents in the tower ring to insure air flow through the tower ring.

7. The method of claim 1, wherein the platform is formed in a D shape.

8. The method of claim 1, wherein the platform is formed from an expanded metal grating.

9. The method of claim 1, wherein the platform is formed from solid metal.

10. The method of claim 1, further comprising the step of joining at least two tower rings together, wherein the tower rings comprise identical diameters.

11. The method of claim 1, further comprising the step of joining a plurality of tower rings jointed together, wherein upper ends of each ring are welded flush to lower ends of the adjoining ring, wherein one ring is connected to the embedment ring, and wherein one ring is welded to the ballistic resistant stub.

12. The method of claim 1, wherein the tower comprises a height ranging from about 10 feet to about 250 feet.

13. The method of claim 1, further comprising the step of using metal plate to form the tower rings that comprise a thickness optimized to minimize weight and maximize resistance to impact load at about 5 psi for about 5 milliseconds and a pulse load of about 24 psi for about 200 milliseconds.

14. The method of claim 1, further comprising the step of coating the tower with one coat of 20-year life paint.

15. The method of claim 1, further comprising the step of mounting a control box on the interior side of the tower ring in communication with the conduits.

16. A method for constructing a ballistic resistant tower for use in a nuclear facility, wherein the method comprises the steps of:
   a. forming a nuclear facility tower ring for a ballistic resistant tower in the nuclear facility, wherein the ballistic resistant tower comprises an interior side, an upper end, and a lower end, wherein the nuclear facility tower ring further comprises:
      i. a marine door welded at the lower end;
      ii. a platform connected to a portion of the interior side;
      iii. a spiral staircase for connecting the marine door to the platform;
      iv. a ship ladder for connecting the platform to an opening; and
      v. a plurality of conduits fixed on the interior side connecting the lower end and the upper end, and wherein the conduits for communication and power transfer extend from the lower end to the upper end.
   b. welding a ballistic resistant stub to a structural ring on a ballistic resistant enclosure, wherein the ballistic resistant enclosure comprises a hatch for permitting entry of personnel into the ballistic resistant enclosure;
   c. constructing an embedment ring with a plurality of perforations, wherein the embedment ring is adapted to support a dynamic load and an impulse load of at least 24 psi for 5 milliseconds;
   d. securing the embedment ring to a foundation located in the nuclear facility;
   e. securing at least one nuclear facility tower ring on the embedment ring using a slip ring, wherein the slip ring assures alignment of the tower ring with the embedment ring;
   f. slipping the ballistic resistant stub into the interior side and the upper end of the tower ring; and
   g. welding the ballistic resistant stub to the interior side of the nuclear facility tower ring.

* * * * *